United States Patent
Le Saint et al.

(10) Patent No.: US 8,200,195 B2
(45) Date of Patent: Jun. 12, 2012

(54) INTELLIGENT REMOTE DEVICE

(75) Inventors: Eric F. Le Saint, Los Altos, CA (US);
Dominique Louis Joseph Fedronic, Belmont, CA (US)

(73) Assignee: Activcard Ireland, Limited, Dublin (IE)

( * ) Notice: Subject to any disclaimer, the term of this patent is extended or adjusted under 35 U.S.C. 154(b) by 0 days.

(21) Appl. No.: 12/931,351

(22) Filed: Jan. 28, 2011

(65) Prior Publication Data
US 2011/0252466 A1 Oct. 13, 2011

Related U.S. Application Data

(63) Continuation of application No. 10/740,497, filed on Dec. 22, 2003, now Pat. No. 7,907,935.

(51) Int. Cl.
*H04M 1/66* (2006.01)
(52) U.S. Cl. ......................................... 455/411; 713/172
(58) Field of Classification Search .................. 455/410, 455/411; 713/155, 156, 185, 150, 172
See application file for complete search history.

(56) References Cited

U.S. PATENT DOCUMENTS

| | | | |
|---|---|---|---|
| 2002/0162021 A1* | 10/2002 | Audebert et al. | 713/201 |
| 2002/0194499 A1* | 12/2002 | Audebert et al. | 713/201 |
| 2005/0050323 A1* | 3/2005 | Mizrah | 713/168 |

* cited by examiner

*Primary Examiner* — Tu X Nguyen
(74) *Attorney, Agent, or Firm* — Muirhead and Saturnelli, LLC

(57) ABSTRACT

An intelligent remote device equipped with a security token operatively coupled thereto is processing communications with a security token enabled computer system over a wireless private network. The intelligent remote device is adapted to emulate a local security device peripheral connected to the computer system. Multiple computer systems may be authenticated to using the intelligent remote device. Additionally, various secure communications connections mechanisms are described which are intended to augment existing security protocols available using wireless network equipment. Authentication of a user supplied critical security parameter is performed by the security token. The critical security parameter may be provided locally via the intelligent remote device or received from the wireless network and routed to the security token. Aural, visual or vibratory feedback may be provided to the user to signal a successful authentication transaction.

18 Claims, 9 Drawing Sheets

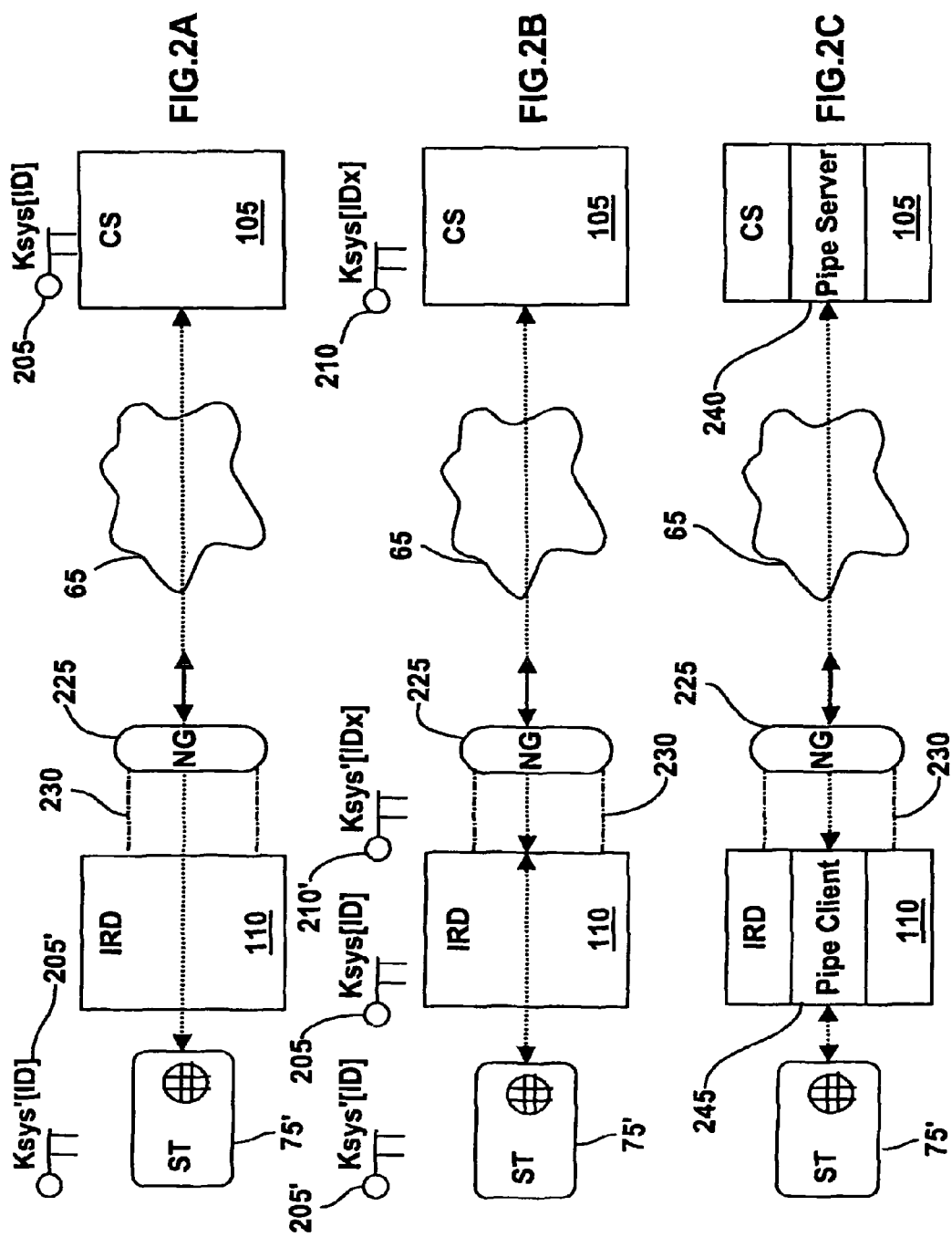

INTELLIGENT REMOTE DEVICE

RELATED APPLICATIONS

This application is a continuation of U.S. application Ser. No. 10/740,497, filed Dec. 22, 2003 now U.S. Pat. No. 7,907,935, which is hereby incorporated by reference.

FIELD OF INVENTION

The present invention relates generally to a data processing method, system and computer program product and more specifically to an intelligent remote device equipped with a security token which is used to emulate for authentication purposes, a local security token peripheral device connected to a host computer system.

BACKGROUND

The explosive growth in the use of portable intelligent devices and network appliances has created demand for security mechanisms to be deployed which takes advantage of the greater user flexibility offered by these device. An ideal use for these devices is to simplify access to one or more computer systems in which a user may be required to interact with. For example, in an enterprise computing environment, a typical user may have a computer system which is used at a primary work location and a laptop which is used while the user is traveling.

In many cases, different user credentials are required to access the computer system and the laptop as a defensive measure for preventing cascading security compromises. Furthermore, the practice of using static user names and passwords has fallen into disfavor as this type of user credentials are frequently compromised, temporarily forgotten and increases administrative expenses by requiring a "helpdesk" type arrangement to assist users whose user names and passwords have either been forgotten or compromised.

A more secure solution is to provide a portable security device such as a security token which minimizes the number of credentials a user is required to remember and provides a much more secure mechanism to authenticate the user to a computer system. However, equipping each computer system with a separate security token, reader and interface software can be expensive to deploy and maintain, thus presenting a formidable economic barrier to improving computer system security over the use of static user names and passwords.

One possible solution is to provide an alternate mechanism for authenticating to one or more computer systems which minimizes the number security tokens, readers and interface software required to be installed and maintained. An example of which is shown in European patent application EP 1061482 A1 to Cuong. The Cuong application discloses an intelligent portable device which allows a user to authenticate to a plurality of financial service providers using a single universal security token in the form of a smart card. The basic goal of this application is to reduce the number of smart cards required to be carried by the user.

Another solution is disclosed in U.S. Pat. No. 6,016,476 to Maes, et. al. The Maes patent discloses an intelligent portable device for use by a consumer for point of sales and other financial transactions using the same concept of a single universal security token in the form of a smart card. This patent addresses security mechanisms such as biometric authentication to prevent unauthorized access to the user's universal security token.

Both the Cuong application and the Maes, et al. patent are intended to be used over a public network in a client-server arrangement where the user is authenticating to a external organization rather than there own organization. No particular emphasis is placed on the security of the telecommunications link.

In yet another approach, U.S. patent application Ser. No. 09/880,795 to Audebert, et al., provides a solution which may be implemented over a public or private network using a client-server and/or a peer-to-peer authentication arrangement. This application addresses the limitations described above but does not address security issues related to wireless telecommunications links or alternate user login mechanisms associated with accessing the user's unattended computer system. This application is to a common assignee and is not admitted as prior art to the instant application.

In the relevant art, it has been determined that certain of the earlier wireless security protocols could be compromised by a reasonably sophisticated attacker. For example, the wireless equivalent privacy (WEP) specified by the IEEE 802.11:1999 standard was intended to provide roughly the same level of confidentiality for wireless data that is available in a wired (Ethernet) LAN which is not protected by encryption. Later versions of the IEEE 802.11 standards have improved the level of security of wireless connections. However, total reliance on developing security protocols is not advisable. As such, additional security measures should be provided to ensure that authenticating information is not compromised or vulnerable to "man-in-the-middle," "dictionary" or "replay" type attacks.

Lastly, a secure mechanism needs to be established which allows a user to authenticate to his or her computer system which does not require significant changes to existing user authentication mechanisms included in computer operating systems and does not reduce the overall level of security afforded by the existing authentication mechanisms.

Therefore, a secure authentication arrangement which allows an intelligent remote device to emulate a local security device peripheral in a peer-to-peer relationship over a private network without reduction in the overall level of security would be highly advantageous in current enterprise computing environments.

SUMMARY

This invention addresses the limitations described above and provides an intelligent remote device equipped with a security token which emulates a local security device peripheral in a peer-to-peer relationship over a private network without reduction in the overall level of security. The intelligent remote device includes a personal data assistant (PDA), a cellular telephone having private networking capabilities, a network appliance or a personal security device such as a secure PIN pad.

The term "security token" as described herein includes hardware based security devices such as cryptographic modules, smart cards, integrated circuit chip cards, portable data carriers (PDC), personal security devices (PSD), subscriber identification modules (SIM), wireless identification modules (WIM), USB token dongles, identification tokens, secure application modules (SAM), hardware security modules (HSM), secure multi-media token (SMMC), trusted platform computing alliance chips (TPCA) and like devices.

In various method embodiments of the invention, the invention comprises a method for accessing a security token enabled computer system using an intelligent remote device as a communications interface for a security token.

The method includes the establishment of a first communications connection between the intelligent remote device and a network gateway coupled to a network in common with a computer system. The network in common includes private wireless networking such as BlueTooth, HomeRF, and IEEE 802.11 a/b/g and its successors.

The communications connection utilizes existing security protocols established for the network interface devices and is essentially the connection handshake between the intelligent remote device and the network gateway. Examples of which include secure socket layer (SSL), transport layer security (TLS), private communications technology (PCT), internet protocol security (IPsec) or a secure messaging arrangement.

The secure messaging arrangement incorporates a shared symmetric key pair for cryptography purposes which is uniquely identified by a session identifier generated and assigned by the security token. Alternately, or in combination with the symmetric key cryptography, an APDU communications pipe may be established between the computer system and the security token. The APDU communications pipe allows exchanging of native security token APDU commands and responses which are encapsulated in standard networking protocols such as TCP/IP.

Once the communications connection is established, a critical security parameter (CSP) associated with a user is provided to the security token using the intelligent remote device as a communications interface. A critical security parameter as defined herein includes authentication data, passwords, PINs, secret and private cryptographic keys which are to be entered into or output from a cryptographic module and is intended to be synonymous with the definition of CSP included in FIPS PUB 140-2, "Security Requirements for Cryptographic Modules."

The provided critical security parameter may be directly entered using a user interface included with the intelligent remote device or sent from a remote location via the communications connection. For example, a biometric scanner may be directly connected to the user's computer system or coupled to the network in common. In this arrangement, the generally greater computing power of the user's computer system may be used to process a biometric sample which subsequently matched by the security token.

The provided user's critical security parameter is then used to perform an authentication transaction, in which the user is authenticated to the computer system and the security token. A two factor authentication transaction may be incorporated as well where the security token is authenticated to the computer system by exchanging authenticating information during establishment of the communications connection. The two factor authentication process may be performed using dynamic one-time passwords, challenge/response or by digital certificate exchanges. Upon successful completion of the authentication transaction, the user is allowed access to at least one secure resource associated with the computer system.

To ensure security and to facilitate communications between the security token and the computer system through a network address translation (NAT) type firewall, the communications connection is initiated by sending an access request message from the intelligent remote device to the computer system. The access request message provides sufficient information to the network gateway for routing to the target computer system and includes a return network address in which the target computer system is to respond. Multiple logical connections may be established over the network with one or more computer systems to employ the intelligent remote device as a security peripheral device. The access request message further includes information which identifies the intelligent remote device and associated security token.

The computer system includes an alternate user authentication method which allows the user to remotely authenticate to the computer system over the communications connection. The term "method" as defined herein is used in its broadest context which includes a function, application, routine, remotely invocable method, subroutine or applet. The alternate user authentication method includes an agent which monitors incoming network traffic directed to the computer system for an access request message. The agent invokes the alternate user authentication method which is an adjunct or replacement of a main user authentication method.

Aural or visual feedback is provided to the user following successful authentication. This allows the user to determine which computer system among a plurality of computer systems has been authenticated. The aural or visual feedback may be provided on either or both the intelligent remote device and the authenticated computer system.

In another embodiment of the invention, a trusted path is established between the security token and the intelligent remote device. The trusted path allows the intelligent remote device to be used in high security operating environments such as FIPS security levels 3 and 4 which requires that critical security parameters be entered into or output from a cryptographic module in an encrypted form to prevent interception of the critical security parameters.

In various embodiments of the invention, the hardware portion of the invention includes an intelligent remote device equipped with a security token in processing communications with a computer system over a network. The network includes a wireless private network such as BlueTooth, HomeRF, IEEE 802.11 a/b/g and successors which incorporate a secure communications protocol comprising secure socket layer (SSL), transport layer security (TLS), private communications technology (PCT), internet protocol security (IPsec) or a secure messaging arrangement.

The intelligent remote device includes a personal data assistant (PDA), a cellular telephone having private networking capabilities, a network appliance or a personal security device such as a secure PIN pad.

The intelligent remote device is equipped with the necessary hardware, software and firmware to emulate a security token peripheral device which is locally connected to the computer system and includes the abilities to; operatively couple the security token to the intelligent remote device, send an access request message over the network to the computer system to invoke establishment of a secure communications connection between the security token and the computer system, provide cryptographic protection of data exchanged between the intelligent remote device and the computer system, receive a critical security parameter provided by the user either directly or received through the secure communications connection, exchange information over the network using an APDU communications pipe and provide aural or visual feedback to the user upon successful completion of a two-factor authentication transaction.

The security token is comprised of hardware based security devices such as cryptographic modules, smart cards, integrated circuit chip cards, portable data carriers (PDC), personal security devices (PSD), subscriber identification modules (SIM), to wireless identification modules (WIM), USB token dongles, identification tokens, secure application modules (SAM), hardware security modules (HSM), secure multi-media token (SMMC), trusted platform computing alliance chips (TPCA) and like devices. The security token is provided with at least one operatively installed reference critical security parameter associated with the user and includes the abilities to; receive a critical security parameter associated with the user, perform an authentication transaction.

The computer system includes at least one workstation, server, desktop, laptop, personal computer, mini computer or mainframe computer which requires user authentication prior to allowing a user to access. The computer system portion of the invention is equipped with the necessary hardware, software and firmware to allow the user to remotely authenticate to the computer system over the network as if the user were local to the computer system and includes the abilities to; receive an access request sent over the network from the intelligent remote device, establish the communications connection between the computer system and the security token, execute an alternate user authentication method which allows the user to remotely authenticate to the computer system over the network using the two factor authentication transaction, exchange information over the network or communications connection using an APDU communications pipe and allow the user access to the computer system following successful completion of the two factor authentication transaction.

The intelligent remote device and security token enabled computer system include a set of application program interfaces embodied on a computer readable medium for execution by a processor which allows the intelligent remote device to emulate a security token peripheral device locally connected to the security token enabled computer system. The application program interfaces comprise a first interface that exchanges information between a security token and the security token enabled computer system in a protocol native to the security token and a second interface that receives and routes a critical security parameter to the security token.

In one embodiment of the invention, the first set of application interface programs installed in the intelligent remote device provides protocol conversion into a protocol native to the security token. In another embodiment of the invention, the first set of application interface programs installed in the intelligent remote device extracts the information from communications packets already in a protocol native to said security token.

The programs and associated data may be stored on transportable digital recording media such as a CD ROM, floppy disk, data tape, DVD, or removable hard disk for installation on the computer system, intelligent remote device and/or security token as one or more transportable computer program products. The programs and associated data comprise executable instructions which are stored in a code format including byte code, compiled, interpreted, compliable or interpretable.

The computer program product embodied in the tangible form is readable by a plurality of processors in processing communications and includes executable instructions stored for causing one or more of the plurality of processors to; establish a secure communications connection between a security token and a security token enabled computer system via an intelligent remote device, authenticate at least the security token to said security token enabled computer system, provide a critical security parameter associated with a user to the security token and authenticate the critical security parameter by the security token.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. It is intended that changes and modifications can be made to the described embodiment without departing from the true scope and spirit of the subject invention as defined in the claims.

FIG. 1B-1—is a detailed block diagram of the functional modules incorporated into the security token enabled computer system.

FIG. 1B-2—is a detailed block diagram of the functional modules incorporated into the intelligent remote device.

FIG. 2A—is a detailed block diagram of one embodiment of a secure communications connection between the security token and the security token enabled computer system where a shared symmetric key pair are incorporated into the secure connection.

FIG. 2B—is a detailed block diagram of another embodiment of a secure communications connection between the security token and the security token enabled computer system where two sets of symmetric key pairs are incorporated into the secure connection.

FIG. 2C—is a detailed block diagram of another embodiment of a secure communications connection between the security token and the security token enabled computer system where an APDU communications pipe is incorporated into the secure connection.

DETAILED DESCRIPTION

This present invention provides an arrangement which allows an intelligent remote device to securely emulate a local security device peripheral connected to a security token enabled computer system via a network. The applications are envisioned to be programmed in a high level language such as Java™, C++, C, C# or Visual Basic™.

Figure 1:
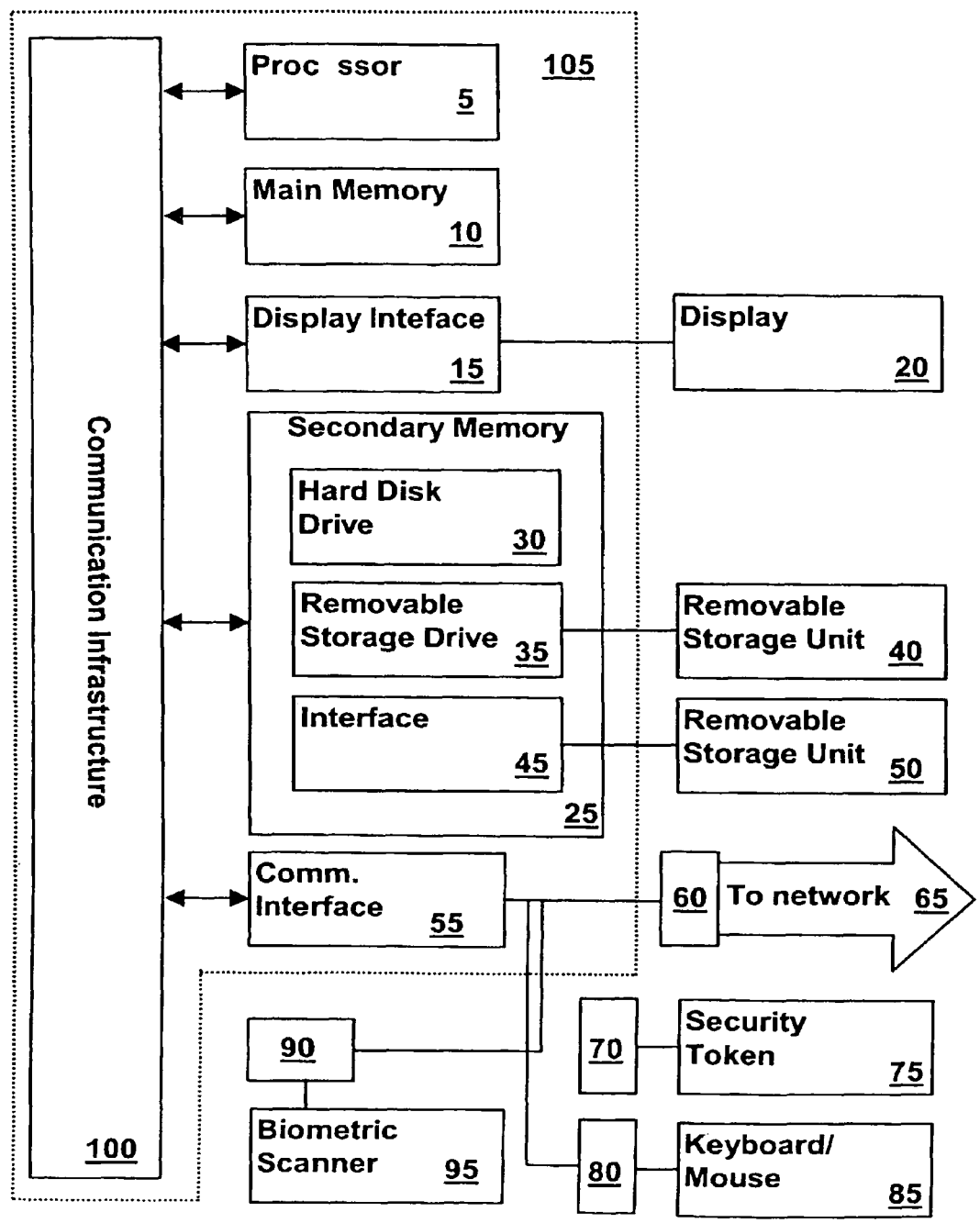
FIG. 1—is a generalized block diagram of a security token enabled computer system and a functionally connected security token.

Referring to FIG. 1, a functional block diagram of the security token enabled computer system is shown which includes a central processor 5, a main memory 10, a display 20 electrically coupled to a display interface 15, a secondary memory subsystem 25 electrically coupled to a hard disk drive 30, a removable storage drive 35 electrically coupled to a removable storage unit 40 and an auxiliary removable storage interface 45 electrically coupled to an auxiliary removable storage unit 50.

A communications interface 55 subsystem is coupled to a network 65 via a network interface 60. A security token 75 is operatively coupled to the communications interface 55 via a security token interface 70. User input devices including a mouse and a keyboard 85 are operatively coupled to the communications interface 55 via a user interface 80. Lastly, an optional biometric scanner is operatively coupled to the communications interface 55 via a biometric scanner interface 90.

The central processor 5, main memory 10, display interface 15 secondary memory subsystem 25 and communications interface system 55 are electrically coupled to a communications infrastructure 100. The host computer system 105 includes an operating system having an extensible, modifiable or replaceable logon security application, a security token application programming interface, one or more security token aware applications, one or more proprietary extensions to the logon security application, a communications agent capable of sensing an incoming access request and invoking an alternate logon method, cryptography software capable of performing symmetric and asymmetric cryptographic functions, secure messaging software and all necessary device interface and driver software.

The security token 75 includes a wireless, optical and/or electrical connection means compatible with the security token interface 70, a processor, a cryptography co-processor, volatile and non-volatile memory electrically coupled to the processor and co-processor, a runtime operating environment, cryptography extensions available to the operating system and capable of performing symmetric and asymmetric cryptographic functions compatible with the computer system's cryptography software, a security executive application, one or more CSP protected applications including two factor authentications are functionally coupled to the security executive application and a public key infrastructure (PKI) key pair functionally coupled to the security executive application.

The security token 75 further includes the necessary authentication applications and cryptographic extensions to successfully perform the two factor authentication transaction with the security token enabled computer system. The non-volatile memory has operatively stored therein one or more reference CSPs which are verified by the security executive application to authenticate a user to the security token. The security token 75 is embodied in a removable form factor, although other form factors will work as well.

The network 65 includes a wireless private network such as BlueTooth, HomeRF, IEEE 802.11 a/b/g and its successors which incorporate a secure communications protocol comprising secure socket layer (SSL), transport layer security (TLS), private communications technology protocol (PCT), internet protocol security (IPsec) or a secure messaging arrangement. The network 65 further includes a network gateway which allows ad hoc connection to the intelligent remote device.

Figure 1A:
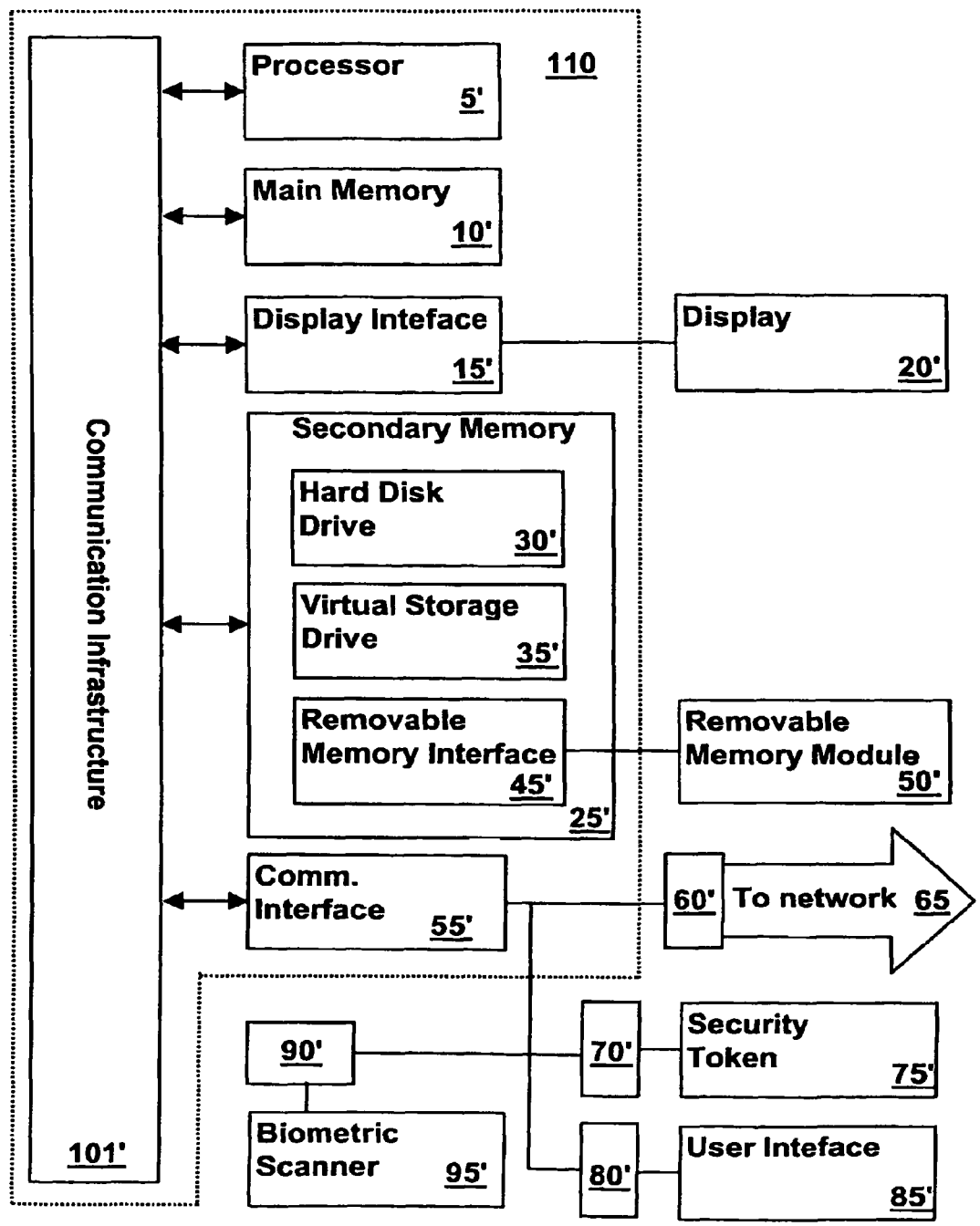
FIG. 1A—is a generalized block diagram of a intelligent remote device.

Referring to FIG. 1A, a functional block diagram of an intelligent remote device 110 is shown. The intelligent remote device 110 essentially incorporates the same modular components included in the security token enabled computer described above. The intelligent remote device includes a processor 5', a main memory 10', a display 20' electrically coupled to a display interface 15', a secondary memory subsystem 25' electrically coupled to an optional hard disk drive 30', a virtual storage drive 35', and a removable memory interface 45' electrically coupled to a removable memory module 50'.

A communications interface 55' subsystem is coupled to a network 65 via a network interface 60', a security token 75' coupled to a security token interface 70' and a user input arrangement including a stylus, pen, a touch sensitive display, a miniature mouse and/or keyboard 85' coupled to a user device interface 80' and an optional biometric scanner 95' coupled to an optional biometric scanner interface 90'. The processor 5', main memory 10', display interface 15' secondary memory subsystem 25' and communications interface system 55' are electrically coupled to a communications infrastructure 100'

The intelligent remote device 110 further includes an operating system having an extensible, modifiable or replaceable logon security application, one or more proprietary extensions to the logon security application, a security token application programming interface, for example PC/SC, one or more security token aware applications, a token emulator application capable of causing the intelligent remote device to transparently exchange security token commands and responses between the network computer system, cryptography software capable of performing symmetric and asymmetric cryptographic functions, secure messaging software and all necessary device interface and driver software. The security token 75' may be the same device normally used to access the security token enabled computer system 105 or another security token containing the necessary information to successfully complete the two factor authentication transaction.

Figures 1, 1B:
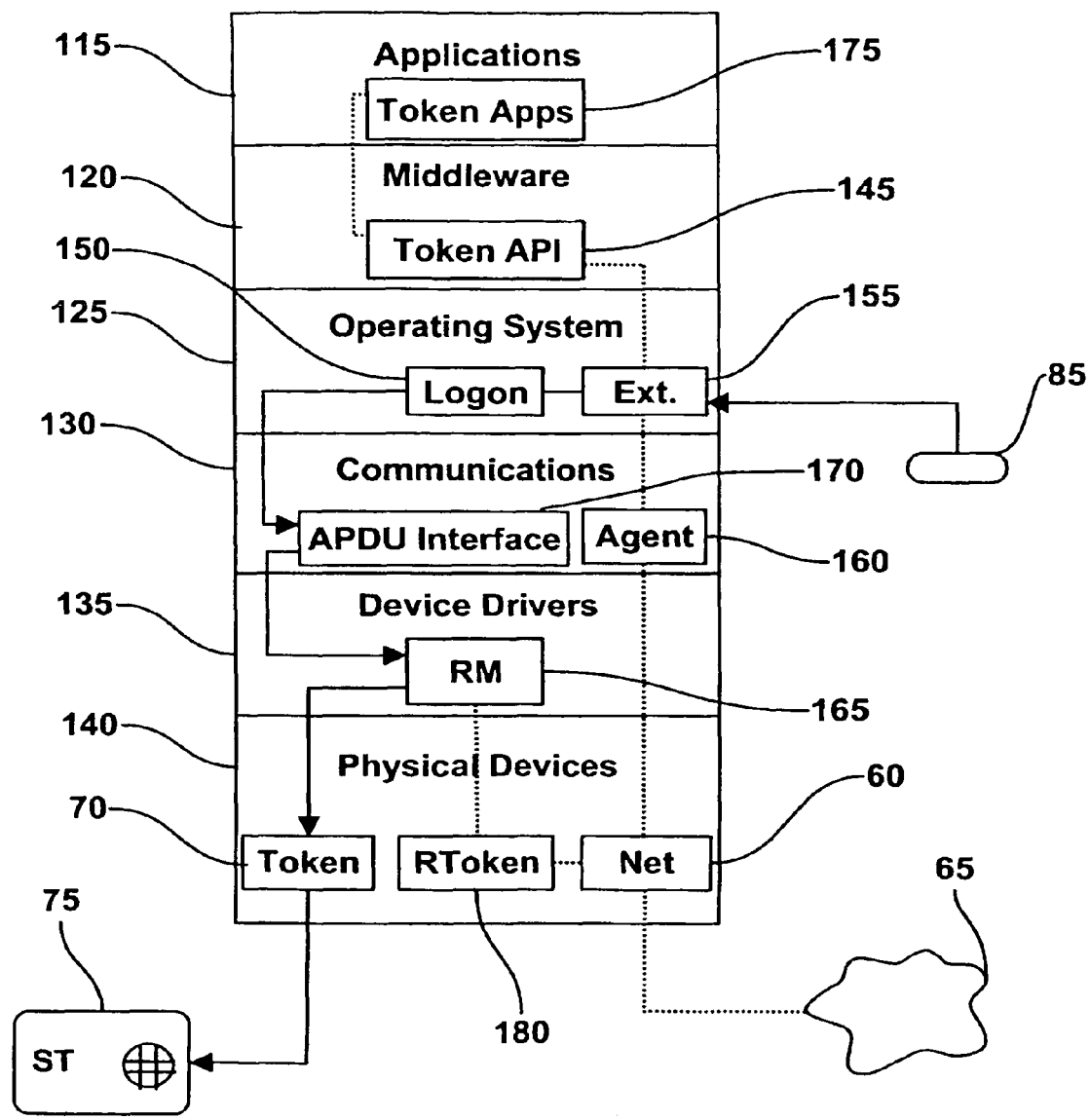

Referring FIG. 1B-1, a functional layer diagram of the computer system is shown. The various layers shown are loosely based on the Open System Interconnection model (OSI). For simplicity, certain layers are not shown and should be assumed to be present and/or incorporated into adjacent layers. The uppermost applications layer 115 includes user and security token aware applications denoted as Token Apps 175.

The middleware layer 120 includes security token application programming interface applications denoted as Token API 145 which allow the user and security token aware applications included in the applications layer 115 to communicate with the attached security token 75. An example of the security token application programming interface is described in the PC/SC workgroup specifications available from the organization's website www.pcscworkgroup.com.

The operating system layer 125 includes the software that controls the allocation and usage of hardware resources such as memory, central processing unit (CPU) time, disk space, and peripheral devices. Included in this layer are the logon security application(s) 150 and added extensions 155 which allows for an alternate user authentication method. A user input device 85 is shown coupled to the added extension Ext 155.

For example, in Microsoft Windows®, a customizable or replaceable dynamically linked library (msgina.dll) is provided which allows inclusion of alternate authentication methods developed by third party vendors. A brief description of how one skilled in the art would customize or replace msgina.dll is presented in "The Essentials of Replacing the Microsoft® Graphical Identification and Authentication Dynamic Link Library," by Ben Hutz and Jack Fink both of the Microsoft Corporation, published June 2001.

In Unix® and Linux® based operating systems, a separate security executive application, hardware and software drivers, and security policy libraries are installed which interfaces with a Pluggable Authentication Module (PAM) and Common Display Environment (CDE). Analogously, the PAM and CDE allows for customization and replacement. An extensive library of supported applications including source codes and documentation is available from the Movement for the Use of Smart Cards in a Linux Environment (MUSCLE) at www.linuxnet.com.

The communications layer 130 is essentially a consolidation of the network and transport layers and includes an agent 160 and APDU Interface software 170, examples of which are provided above. The agent is used to monitor incoming network traffic for an access request message. Detection of an access request message by the agent 160 invokes the alternate user authentication method.

Invocation of the alternate user authentication method by detection of an access request message by the agent 160 causes the resource manager 165 to toggle the security token device interface from the local token device interface 70 to the remote token device interface 180. The APDU Interface software provides protocol conversion between the various communications formats used by the computer system, network and security token. In an alternate embodiment of the invention, APDU protocol conversion is performed by a counterpart application installed in the intelligent remote device.

The data link layer denoted as Device Drivers 135 includes a resource manager 165 which controls access to the security token 75 and is the application responsible for selecting either the local token device driver 175 or remote token device driver 180 based on established logon policies. The software device drivers may be based on the PC/SC (Personal Computer/Smart Card) promulgated by the Open Card$^{SM}$ industry consortium. Additional information is available from the consortium's website at www.opencard.org.

The final layer denoted as Physical Devices 140 includes the local token device interface 70 which couples the security token 75 to the computer system 105. The physical device layer 140 further includes a software based remote token device driver 180. This remote token device driver 180 is included in the physical device layer 140 for simplifying the understanding of the invention only. In actuality, the remote token device driver 180 is installed in the Device Driver layer 135. Lastly, a network interface device 60 provides the physical connection between the computer system 105 and the network 65.

Figures 1, 1B, 2:
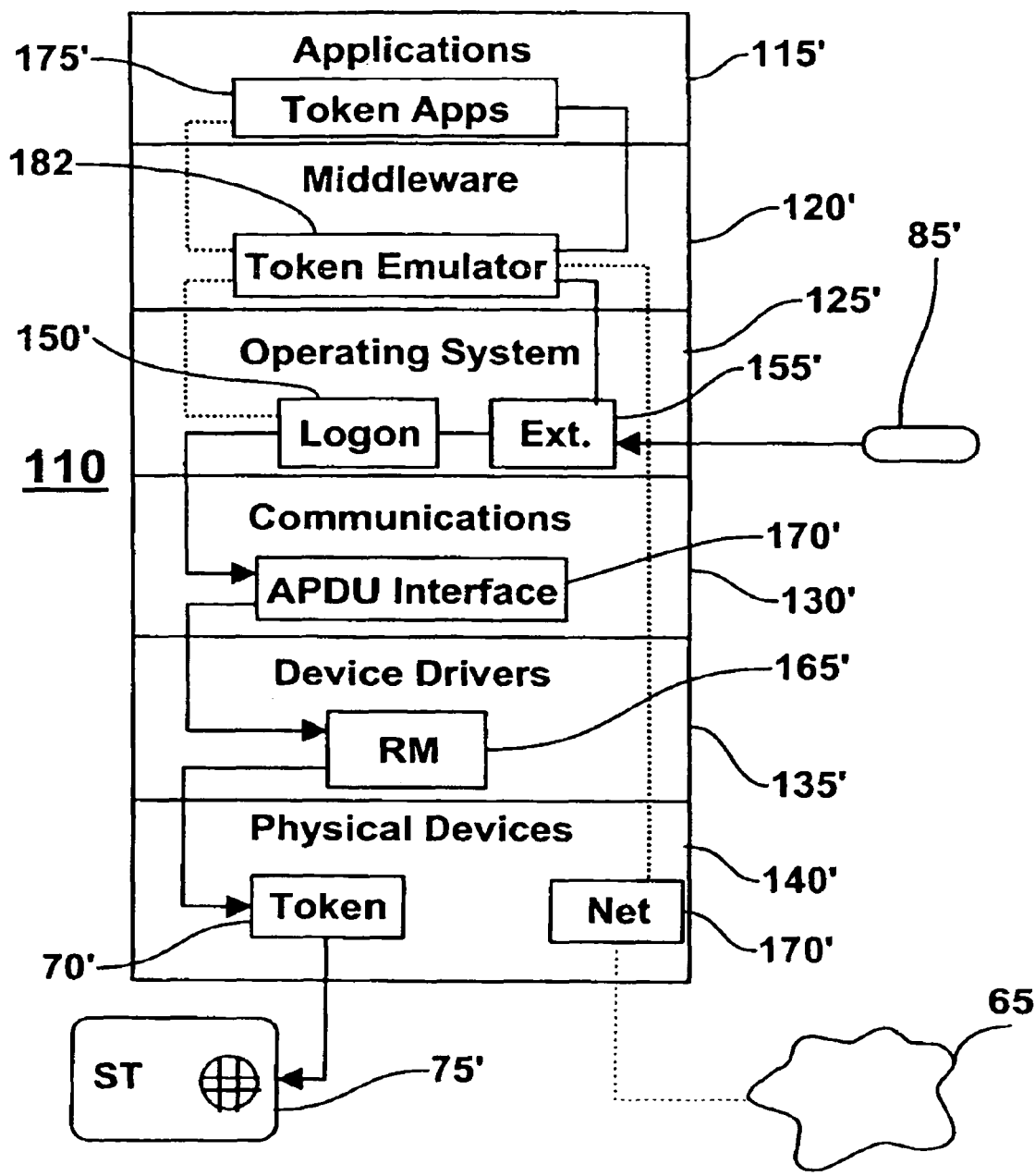

Referring to FIG. 1B-2, a functional layer diagram of the intelligent remote device 110 is shown. As described above, the various layers shown are loosely based on the Open System Interconnection model (OSI.) The intelligent remote device 110 essentially incorporates the same functional layers included in the security token enabled computer described in FIG. 1B-1 and will not be repeated here. A token emulator 182 is shown as a middleware application 120' which allows the intelligent remote device 110 to emulate a security token peripheral device locally connected to the security token enabled computer system 105 over a wireless network 65.

The token emulator 182 includes logical interfaces that facilitates the transparent exchange of information between the security token 75' and the security token enabled computer system 105 in a protocol native to the security token 75' and receives and routes a critical security parameter 85' entered locally to the intelligent remote device 110 or received from the wireless network 65' to the security token 75'. While shown as a middleware application 125', it will be appreciated by one skilled in the art that the token emulator 182 may also be provided as a subroutine, ActiveX control, function, remotely invocable method associated with the Token API 145 or agent 160 installed in the security token enabled computer system 105, or a local browser applet.

The native protocol is generally in the format of an application protocol data unit (APDU) as specified in ISO 7816-4. As described herein, the token emulator facilitates the transparent exchange of APDU commands and responses between the security token enabled computer system 105 and the intelligent remote device 110. Various communications embodiments of the invention are provided which are described in the discussions included with FIGS. 2A-2D which follows.

Figure 1C:
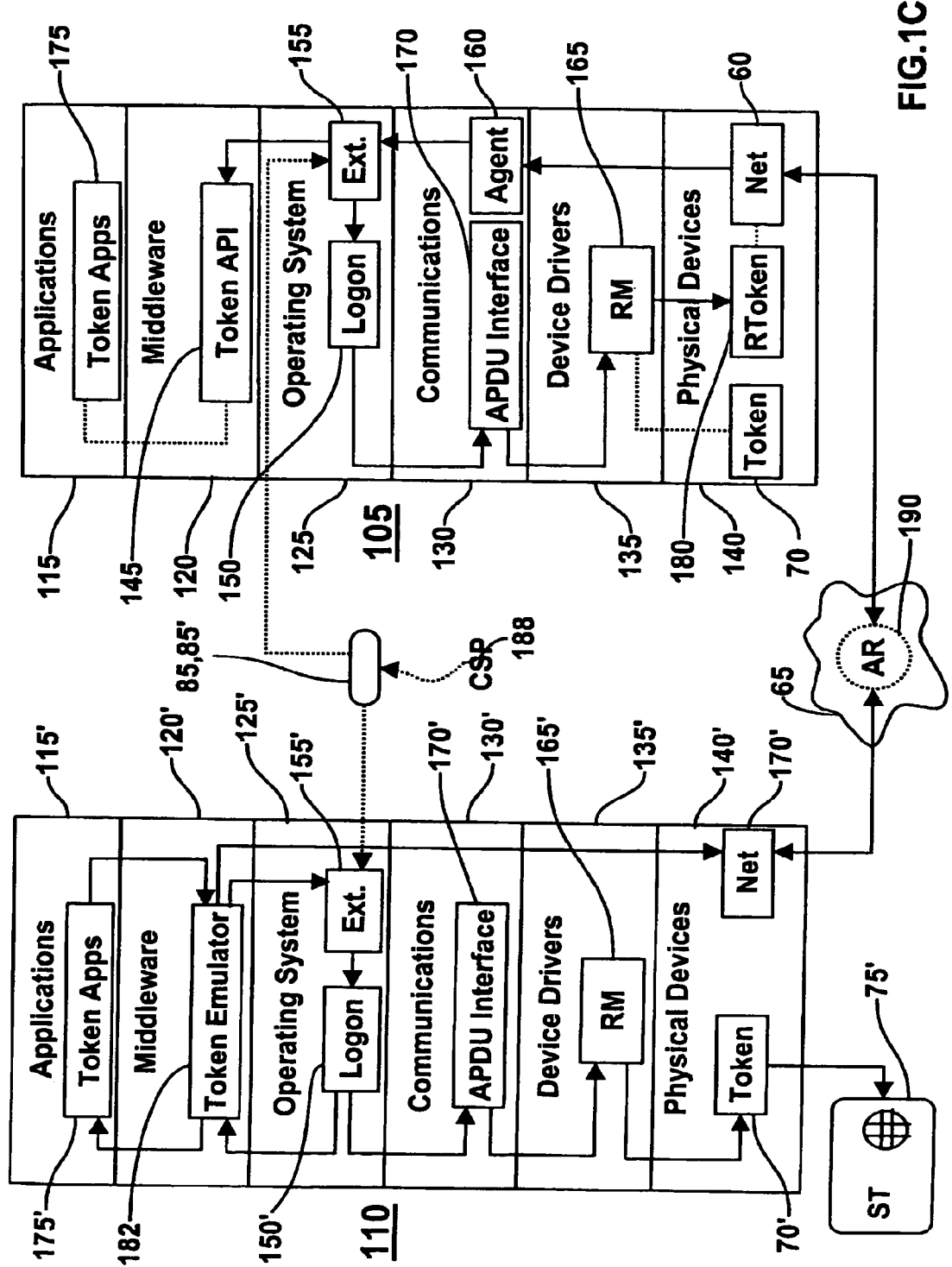
FIG. 1C—is a detailed block diagram of an initiating process which allows the intelligent remote device to emulate a local security device peripheral connected to the security token enabled computer system.

Referring to FIG. 1C, a detailed block diagram illustrating the interaction of the intelligent remote device 110 with the computer system 105 is shown. Details related to security considerations for information exchanged over the network 65 is omitted in the instant discussion in order to simplify the explanation and understanding of this portion of the invention. Security considerations are included in the discussion for FIGS. 2A-2D which follows.

To initiate the process in one embodiment of the invention, a user in possession of the intelligent remote device 110 selects a token aware remote authentication application 175'. The remote authentication application 175' causes the token emulation application 182 to execute an alternate authentication method which implements a pre-established security policy or script associated with the extension EXT 155' to the logon application 150'. Invocation of the logon application 150' causes the remote authentication application 175' to prompt the user to enter his or her critical security parameter (CSP) 188. In a related embodiment of the invention, the token emulator application 182 generates an access request message AR 190 which is sent over the network 65 to the computer system 105.

The access request message includes information about the intelligent remote device such as a unique identifier, information about the operatively coupled security token 75' such as a unique serial number, and information about the assigned network address. The access request message is used to transit a wireless access point in wireless network arrangements.

In a one embodiment of the invention, a user enters his or her CSP 188 through a user input device 85' which is routed by the logon application 150' via the resource manager 165' to the APDU interface 170' for protocol conversion. The CSP 188 incorporated in APDU format is then routed through the security token device interface 70 and into the security token 75'. The security token performs an authentication transaction which authenticates the user to the security token. User authentication is performed by comparison of the entered CSP 188 to a reference CSP stored inside the security token 75'.

In another embodiment of the invention, the CSP 188 may be entered from the security token enabled computer system 105 or a remote location and securely sent over the wireless connection to the security token 75' via the intelligent remote device 110. This alternate embodiment of the invention is particularly suited for biometric authentication which generally requires greater processing power than may be available from the intelligent remote device.

On the computer system 105, receipt of the access request message AR 190 is detected by the agent 160 which causes invocation of the alternate user authentication method. As previously described, invocation of the alternate user authentication method by detection of an access request message by the agent 160 causes the resource manager 165 to toggle the security token device drivers from the local token interface device 70 to the remote token device driver 180. The token API 145 is concurrently invoked by the extension EXT 155 which causes the authentication transaction to be initiated. Control of the counterpart applications installed on the security token enabled computer system 105 and the intelligent remote device may be performed using remote method invocation, subroutines and callable methods. One skilled in the art will appreciate that many alternate mechanisms are available in the relative art to accomplish invocation and control of the counterpart applications and modules.

Figure 1D:
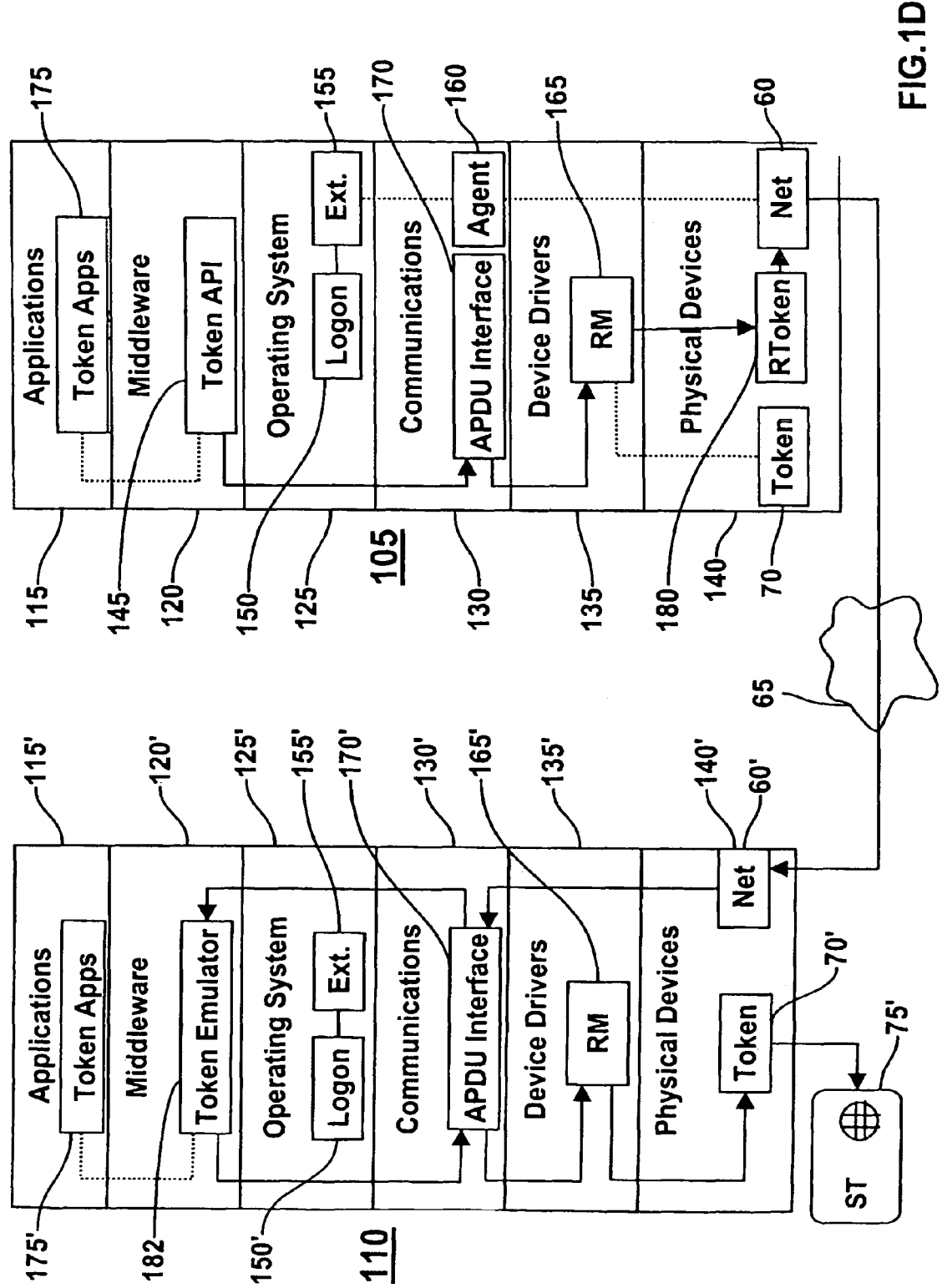
FIG. 1D—is a detailed block diagram of the intelligent remote device emulating a local security device peripheral connected to the security token enabled computer system.

Referring to FIG. 1D, a second part of the authentication transaction is performed under the control of the token API 145. The second part of the authentication transaction utilizes a pre-established security policy or script associated with the logon application 125. The security policy may include challenge/response, digital certificate exchange, dynamic passwords, etc. Authentication data is exchanged via the APDU interface 170 and resource manager 165 using the remote security token device interface 180 and network interface 60 and exchanged over the network 65 with the intelligent remote device 110. Authentication data received at the network interface 60' of the intelligent remote device is routed by the token emulator 182 via the resource manager 165' and APDU interface 170' through the security token device interface 70' and into the security token 75'.

Referring to FIG. 2A, a secure messaging arrangement is shown where a symmetric key pair Ksys'[ID] 205', Ksys[ID] 205 having a unique session identifier assigned by the security token 75' is used to provide end-to-end cryptographic protection of information exchanged between the security token ST 75' via the intelligent remote device IRD 110 and the computer system CS 105 over the network 65. The network 65 includes a network gateway NG 225 which provides an ad hoc secure connection 230 between the network gateway and the intelligent remote device IRD 110. The symmetric key pair Ksys'[ID] 205', Ksys[ID] 205 are incorporated into a symmetric cryptography arrangement which is described in commonly assigned co-pending U.S. application Ser. No. 10/424,783, first filed on Apr. 29, 2003 entitled "Universal Secure Messaging For Cryptographic Modules," and is herein incorporated by reference.

Referring to FIG. 2B, an alternate secure messaging arrangement is shown where two sets of symmetric key pairs Ksys'[ID] 205', Ksys[ID] 205, Ksys'[Idx] 210', Ksys[Idx] 210, each set of key pairs having a unique session identifier assigned by the security token 75' are used to provide end-to-end cryptographic protection of information exchanged between the security token ST 75' via the intelligent remote device IRD 110 and the computer system CS 105 over the network 65. The first symmetric key pair set Ksys'[ID] 205', Ksys[ID] 205 is used to provide a trusted path between the security token 75' and the intelligent remote device IRD 110. The trusted path allows the intelligent remote device 110 to be used in high security operating environments such as FIPS security levels 3 and 4 which requires that critical security parameters be entered into or output from a cryptographic module in an encrypted form to prevent interception of critical security parameters.

The second key pair set Ksys'[Idx] 210', Ksys[Idx] 210 provides the secure communications connection between the intelligent remote device IRD 110 and the computer system 105. Other aspects of this second secure communications embodiment are likewise described in the co-pending U.S. application Ser. No. 10/424,783.

Referring to FIG. 2C, another secure communications embodiment is shown where an APDU pipe is established between the intelligent remote device IRD 110 and the computer system CS 105. In this embodiment of the invention, a pipe server 240 application is installed on the computer system CS 105. The pipe server application 240 is used to encapsulate APDU commands into communications packets, generally TCP/IP, for transmission over the network 65 to the intelligent remote device. The APDU's may be encrypted before or after encapsulation in a network communications packet. The pipe server application 240 is also used to separate incoming APDU responses from the network communications packets, convert the resulting APDU responses into a protocol readable by other applications installed on the computer system CS 110.

The intelligent remote device IRD 110 includes a pipe client application 245 which is used to separate incoming APDU commands from the network communications packets and route the resulting APDU commands to the security token 75'. Alternately, the pipe client application 245 packages APDU responses generated by the security token 75' into the network communications packets for transmission over the network 65 to the computer system.

The APDU pipe communications arrangement is described in commonly assigned co-pending U.S. application Ser. No. 09/844,246, first filed on Apr. 30, 2001 entitled "Method and System for Establishing a Remote Connection to a Personal Security Device," and is herein incorporated by reference.

Figure 2D:
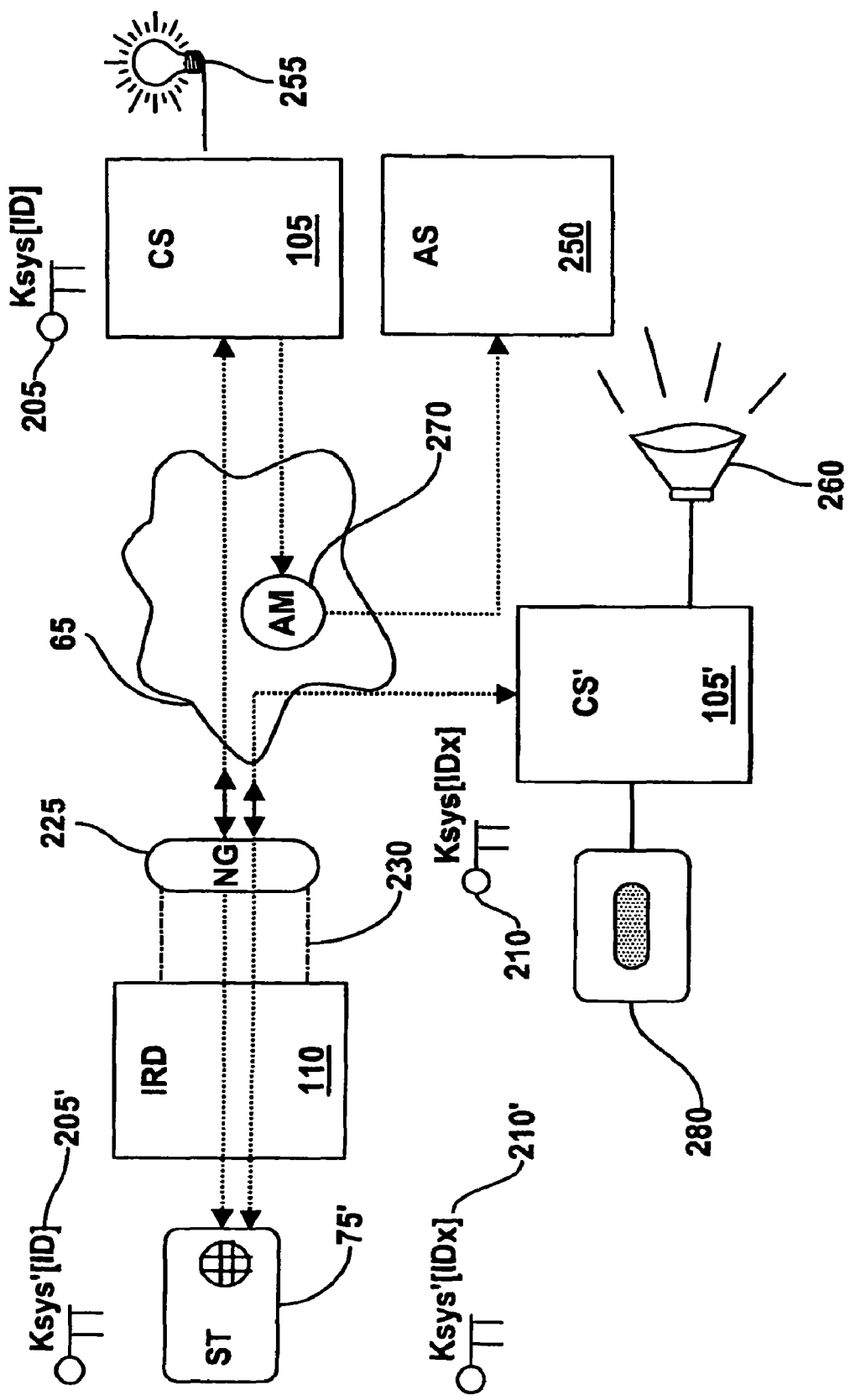
FIG. 2D—is a detailed block diagram of another embodiment of the invention where an additional security token enabled computer system and an authentication server are securely connected to the security token.

Referring to FIG. 2D, another embodiment of the invention is shown where a first secure communications connection is established between the security token and a first computer system CS 105 using a first symmetric key pair set Ksys'[ID] 205', Ksys[ID] and a second secure connection is established between the security token and a second computer system CS' 105' using a second symmetric key pair set Ksys'[Idx] 210', Ksys[Idx] 210 over the network. This embodiment illustrates that multiple computer systems may be authenticated using the intelligent remote device IRD 110. In addition, network access privileges may be obtained by sending an authenticating message AM 270 from the first computer system CS 105 to an authenticating server AS 250 following successful completion the two factor authentication transaction.

Additional embodiments of the invention allow the user to send his or her CSP in the form of a biometric sample to the security token 75' via the secure communications connection. In this embodiment of the invention, a biometric scanner 280 is provided on the second computer system CS' 105' which is securely connected to the security token over the network 65'. The biometric scanner 280 may be associated with another computer system or directly connected to the network 65 as a network appliance.

In yet another embodiment of the invention, aural 260 or visual 255 feedback may be provided to the user following successful completion of the two factor authentication transaction. The aural 260 or visual 255 feedback may be provided at either or both the computer systems CS 105, CS' 105 and/or the intelligent remote device IRD 110.

Figure 3:
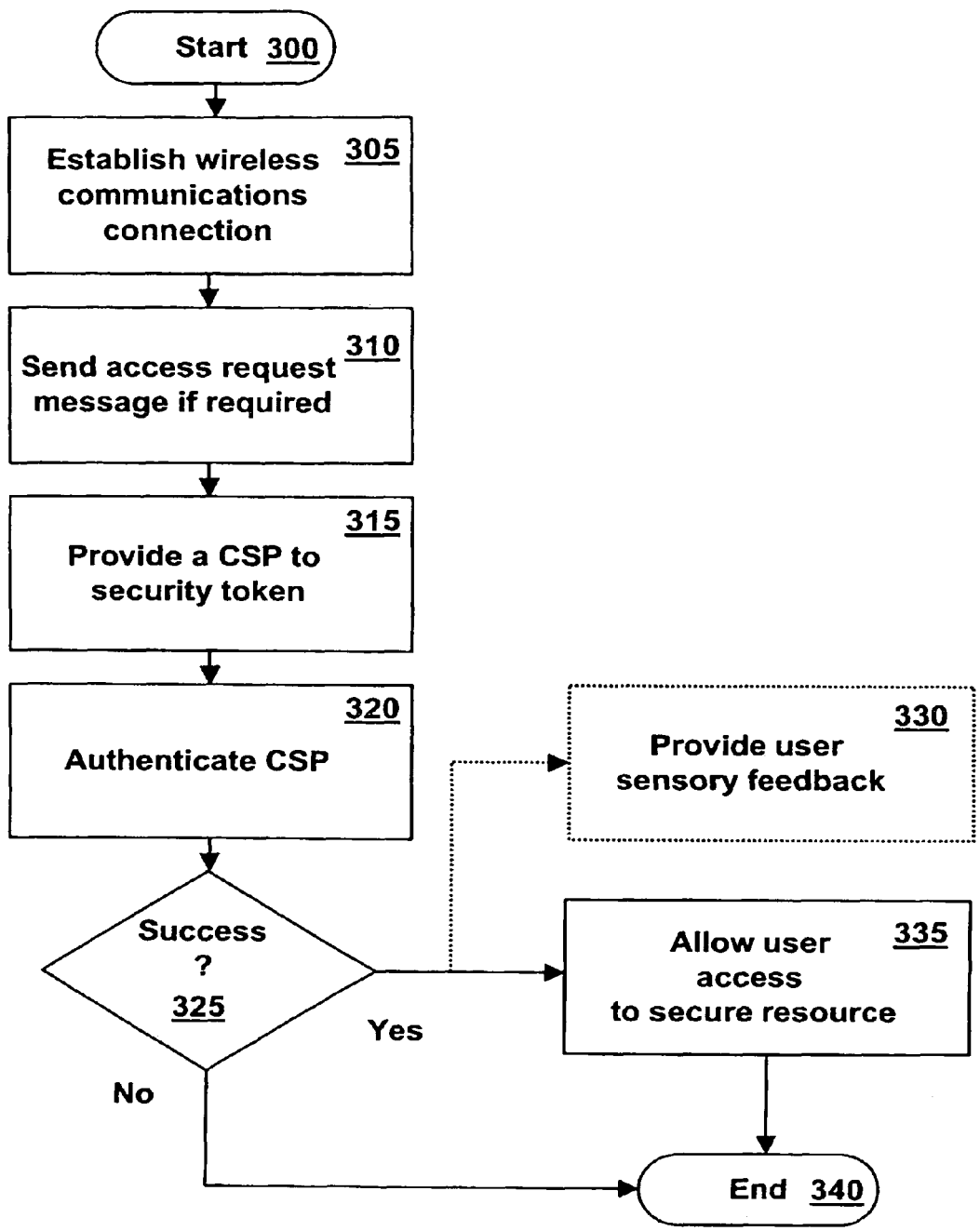
FIG. 3—is a flow diagram illustrating the major steps associated with enabling an intelligent remote device to emulate a local security device peripheral connected to a security token enabled computer system.

Lastly, a flow chart of the major steps involved in implementing this invention is shown in FIG. 3. The process is initiated 300 by a user in possession of a security token equipped intelligent remote device. The intelligent remote device establishes an ad hoc communications connection with a security token enabled computer system 305. The user executes a remote authentication application installed in the intelligent remote device which causes an access request message to be sent to the computer system 310 if required to transit a network gateway or access point and invokes an alternate authentication method which allows the intelligent remote device to emulate a local security device peripheral connected to the computer system.

Concurrently or thereafter, the user is prompted by the remote authentication application to provide his or her critical security parameter (CSP) 315. The critical security parameter may be entered from the intelligent remote device, security token enabled computer system or from another computer system in processing communications with the intelligent remote device. An authentication transaction is then performed in which the user is authenticated to the security token using the provided CSP 320.

If the authentication transaction is unsuccessful 325, processing ends 340. If the authentication transaction is successful 325, the user is allowed access at least one secure resource 335. Optionally, the user is provided with sensory feedback 330 which informs the user of the successful authentication transaction. Also, in the embodiments of the invention which employs symmetric keys having unique session identifiers assigned by the security token, the symmetric keys may be established as temporary surrogates for authenticated CSPs. Processing of the remote authentication transaction ends following its successful completion 340.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. No specific limitation is intended to a particular cryptographic module operating environment. Other variations and embodiments are possible in light of above teachings, and it is not intended that this Detailed Description limit the scope of invention, but rather by the Claims following herein.

What is claimed:

1. A method for accessing a security token enabled computer system, comprising:
    establishing communications connection between an intelligent remote device and the security computer system;
    executing a remote authentication application installed in the intelligent remote device to emulate a local security device peripheral connected to the security token enabled computer system;
    prompting a user to provide a critical security parameter;
    sending the critical security parameter from the intelligent remote device to a security token operatively coupled to the intelligent remote device;
    authenticating the critical security parameter using the security token to authenticate the user to the security token;
    allowing the user access to at least one secure resource associated with the security token enabled computer system; and
    providing aural or visual feedback to the user following successful authenticating to the security token enabled computer system, wherein the critical security parameter is provided from an other computer system and sent to the security token over another communication connection established between the intelligent remote device and the other computer system.

2. The method according to claim 1, further comprising:
    sending an access request message from the intelligent remote device to said security token enabled computer system to initiate establishment of the communications connection.

3. The method according to claim 2, wherein the access request message includes at least one of: a first identifier associated with the intelligent remote device, a second identifier associated with the security token, and a wireless network address associated with the intelligent remote device.

4. The method according to claim 1, wherein establishing the communications connection includes authenticating the security token to the security token enabled computer system.

5. The method according to claim 1, wherein the communications connection includes at least one secure communications protocol having at least one of: a secure socket layer, a transport layer security, private communications technology, internet protocol security, and a secure messaging session.

6. The method according to claim 5, wherein the communications connection further includes an APDU communications pipe.

7. The method according to claim 1, wherein the intelligent remote device is one of: a personal data assistant, a cellular telephone, a network appliance and a personal security device.

8. The method according to claim 1, wherein the communications connection is at least one of: an optical wireless connection, a radio frequency wireless connection, and an electrical connection.

9. A system for accessing a security token enabled computer system, comprising:
    an intelligent remote device that communicates with the security token enabled computer system using a communications connection, operatively couples a security token to the intelligent remote device, receives a critical security parameter provided by a user, and sends the critical security parameter to a security token, wherein the intelligent remote device triggers an access request to the security token enabled computer system to emulate a security token peripheral device locally connected to the security token enabled computers s m
    a security token that receives the critical security parameter associated with the user from the intelligent remote device and authenticates said critical security parameter and
    a security token enabled computer that uses the intelligent remote device as the security token peripheral device and allows the user access to at least one secure resource following successful authentication of the critical security parameter, wherein at least one of the intelligent remote device and the security token enabled computer system provides aural or visual feedback to the user upon successful completion of the authentication transaction, wherein the security token enabled computer system provides the critical security parameter to the security token over the communications connection.

10. The system according to claim 9, wherein the intelligent remote device is one of: a personal data assistant, a cellular telephone, a network appliance and a personal security device.

11. The system according to claim 9, wherein the computer system sends an access request message to the security token enabled computer system.

12. The system according to claim 11, wherein the access request message includes at least one of: a first identifier associated with the intelligent remote device, a second identifier associated with the security token and a wireless network address associated with the intelligent remote device.

13. The system according to claim 9, wherein the communications connection includes at least one secure communications protocol having at least one of: a secure socket layer, a transport layer security, private communications technology, internet protocol security, and a secure messaging session.

14. A system for accessing a security token enabled computer system, comprising:
    an intelligent remote device that communicates with the security token enabled computer system using a communications connection, operatively couples a security token to the intelligent remote device receives a critical security parameter provided by a user and sends the critical security parameter to a security token, wherein the intelligent remote device triggers an access request to the security token enabled computer system to emulate a security token peripheral device locally connected to the security token enabled computer system, a security token that receives the critical security parameter associated with the user from the intelligent remote device and authenticates said critical security parameter; and a security token enabled computer that uses the intelligent remote device as the security token peripheral device and allows the user access to at least one secure resource following successful authentication of the critical security parameter, wherein at least one of the intelligent remote device and the security token enabled computer system provides aural or visual feedback to the user upon successful completion of the authentication transaction, wherein the critical security parameter is provided from another computer system and sent to the security token over another wireless connection established between the intelligent remote device and another computer system.

15. The system according to claim 14, wherein the intelligent remote device is one of: a personal data assistant, a cellular telephone, a network appliance and a personal security device.

16. The system according to claim 14, wherein the computer system sends an access request message to the security token enabled computer system.

17. The system according to claim 16, wherein the access request message includes at least one of: a first identifier associated with the intelligent remote device, a second identifier associated with the security token and a wireless network address associated with the intelligent remote device.

18. The system according to claim 14, wherein the communications connection includes at least one secure communications protocol having at least one of: a secure socket layer, a transport layer security, private communications technology, internet protocol security, and a secure messaging session.

* * * * *